April 14, 1964          W. C. FRY          3,129,366
POWER SUPPLY FOR AN ELECTRO-MECHANICAL VIBRATING TRANSDUCER
Filed Dec. 19, 1960                                     4 Sheets-Sheet 1
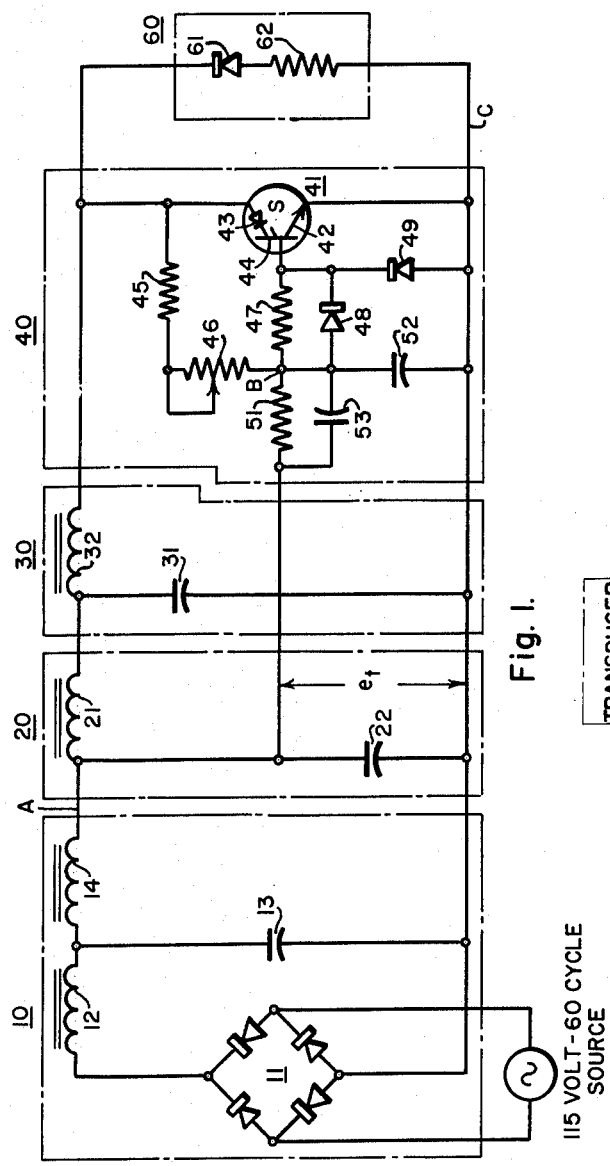
Fig. I.
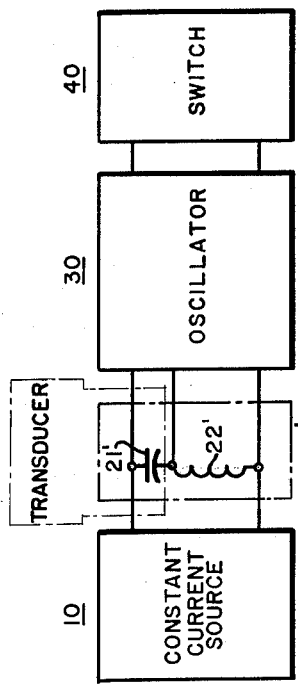
Fig. IA.
WITNESSES:
INVENTOR
Warren C. Fry
BY
ATTORNEY

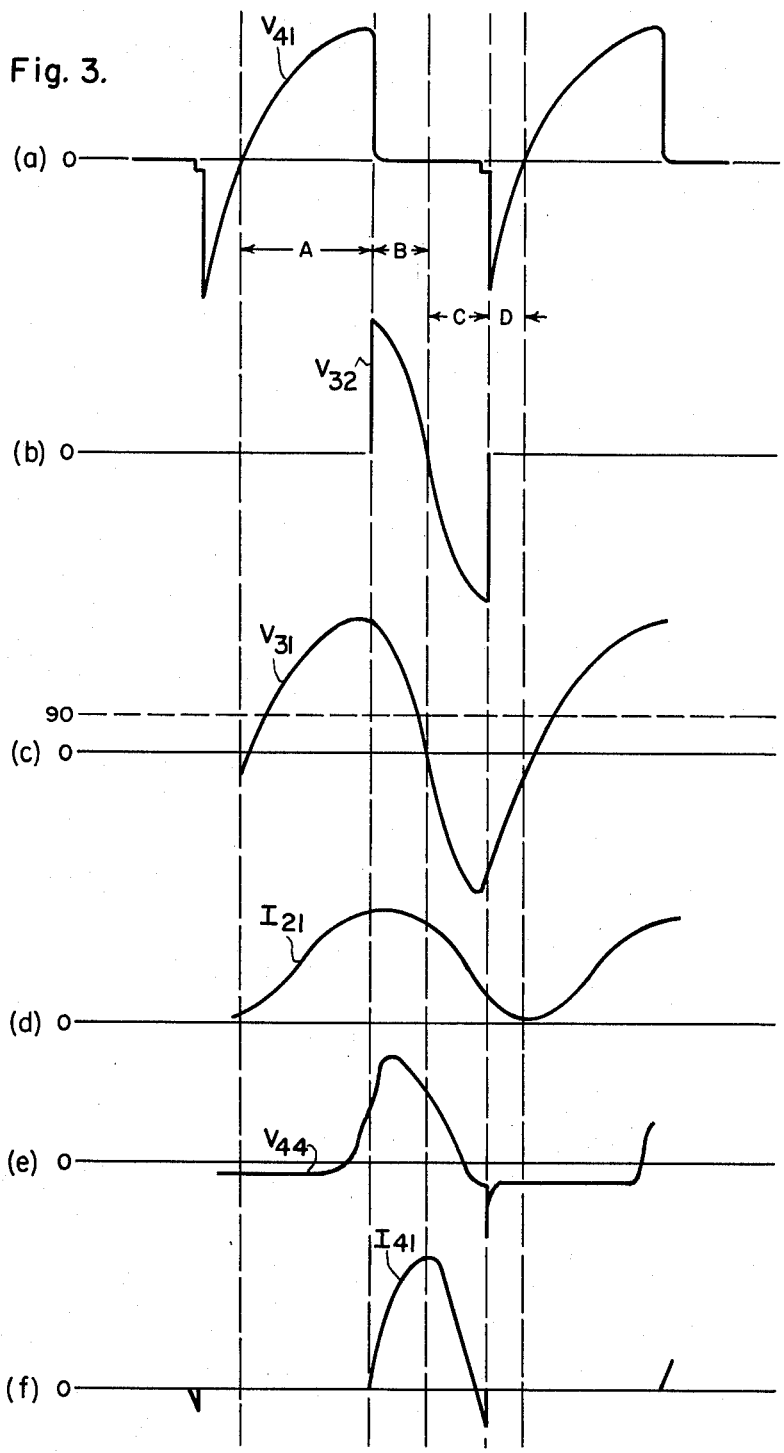

_United States Patent Office_

3,129,366
Patented Apr. 14, 1964

3,129,366
POWER SUPPLY FOR AN ELECTRO-MECHANICAL VIBRATING TRANSDUCER
Warren C. Fry, Cheswick, Pa., assignor to Westinghouse Electric Corporation, East Pittsburgh, Pa., a corporation of Pennsylvania
Filed Dec. 19, 1960, Ser. No. 76,963
16 Claims. (Cl. 318—114)

This invention relates to inverters and more particularly to power supply for driving an electromechanical or vibrating transducer.

An object of the invention is to provide an inverter for producing a relatively high frequency alternating current signal.

Another object of the invention is to provide a well regulating efficient power supply for driving a vibrating transducer.

A further object of the invention is the provision of an inverter, having no vacuum tubes, for driving an ultrasonic vibrating transducer with a maximum efficiency and power transfer.

A still further object of the invention is to provide a power supply for driving a vibrator which is responsive to changes in the resonant frequency of the vibrator to vary the frequency of the inverter to provide maximum power transfer or coupling.

Still another object of the invention is the provision of a solid state ultrasonic power supply for driving an electromechanical vibrating transducer which is responsive to changes in the resonant frequency of the transducer to shift the frequency of the inverter towards the resonant frequency of the transducer.

Still a further object of the invention is to provide an inverter for producing a relatively high frequency alternating current signal which automatically tracks the resonant frequency of an electromechanical load.

A still further object of the invention is the provision of an inverter which is efficient, light in weight and relatively small in size.

A still further object of the invention is to provide a relatively high power ultrasonic power supply for an electromechanical vibrating transducer requiring no output transformer between the power supply and the transducer.

Other objects and advantages of the invention will become apparent from a reading of the following specification when described in conjunction with the attached drawing, in which:

FIGURE 1 is a schematic diagram of one embodiment of the invention;

FIGURE 1A is a schematic diagram of another embodiment of the invention;

FIGURE 3 illustrates waveforms occurring during the operation of the embodiment of the invention illustrated in FIG. 1.

Figure 2A:
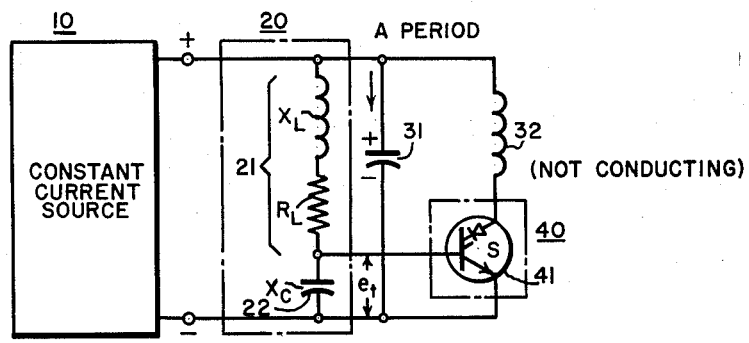
FIGURES 2A, 2B, 2C and 2D are symbolic schematic diagrams useful in explaining the operation of the device illustrated in FIG. 1.

The embodiment of the invention illustrated in FIG. 1 comprises a constant current source 10 which is applied to an L-C network oscillator 30 to charge the network. The oscillator includes two impedance elements reciprocally related; that is, one is a capacitor and one is an inductor. A switch means 40 provides a discharge path for the capacitor of the L-C oscillator to thereby control the frequency of the oscillations. Also connected to the source of constant current 10 is a trigger means in the form of a phase shifting network 20 which provides a trigger signal that is out of phase with the oscillations of the L-C oscillatory network 30. This signal is applied to the switch means 40 to render the switch means periodically conductive and thereby effect discharge of the L-C oscillator and initiate oscillations of the oscillator. The actuating or phase shifting network 20 produces an A.C. waveform which under fixed load conditions maintains a fixed phase relationship with the output of the oscillator 30 so as to accurately trigger the switch means 40 and thereby provide a constant frequency output signal from the inverter. This phase shifting network includes a transducer having a driving reactive member 21 which is employed to drive an electromechanical transducer to provide mechanical vibrations for such uses as an ultrasonic cleaner. This reactive member 21 is included in the phase shifting network which determines the firing of the switch means 40, and any change in the electrical equivalent characteristics of transducer will result in a phase change of the trigger signal of the network 20, relative to the charging and oscillations of the L-C network 30. This phase change will be effective to vary the frequency of the oscillations of network 30 toward the new resonant frequency of the transducer since the output of the phase shifting network 20 determines the frequency of firing of the switch means 40 and thereby the frequency of the L-C network 30.

More specifically the embodiment of the invention illustrated in FIG. 1 comprises a source of constant current 10 which includes a source of alternating current which is applied to a full wave rectifier 11 with an L-type filter including a choke 12 and a capacitor 13 positioned across the output of the rectifier. Additionally, the source 10 includes an inductor 14 which has a value to provide a relatively high A.C. voltage drop at the frequency of the oscillator 30 so as to enable the source of current supply 10 to provide a constant current independent of the oscillations of the power supply. The constant current source 10 is connected across a condenser 22 of the network 20. The condenser 22 is a power factor correction condenser and is also a reactance member that with the load inductor 21 of the transducer, determines the phase of the output voltage of the phase shifting network 20. The reactive member 21 of phase shifting network 20 is a relatively high value inductor (a low impedance) and is the driving coil or load coil for the vibrating transducer. If the driving element 21 were capacitive, such as a ceramic transducer, the capacitor 22 would be replaced by an inductor to provide the proper phase shifts as shown in FIG. 1A. That is, a member having a reactance of opposite kind to the reactive member 21 is used in the phase shifting network 20. The inductor 21 is connected between the point of constant current A and the L-C network 30. The phase shifting network 20 is operably connected to the switch means 40 by resistor 51.

The reactive member 21 has virtually no D.C. voltage drop thereacross. Hence, the constant current source 10 is effectively applied across the charging capacitor 31 of the L-C oscillator 30 which includes inductor 32.

The L-C network 30 includes a charging capacitor 31 and an inductor 32. As the charging capacitor 31 is charged by the constant current source, the voltage across capacitor 31 will be applied to the switch means 40.

Switch means 40 includes a semiconductor switch 41 such as a four region three terminal p-n-p-n device having an anode and cathode connection and a gate or intermediate base connection to actuate the device. Such a device is illustrated on page 50 of "Electronics," March 6, 1959. The semiconductor switch 41 is connected between the choke 32 and charging capacitor 31 so as to provide a discharge path for the charging capacitor 31 when the rectifier 41 is rendered conductive. Switch 41 has an anode 43 which is connected to the choke 32 and a cathode 42 which is connected to capacitor 31. The gate 44 of controlled rectifier 41 is connected to the cathodes of diodes 48 and 49 and is also connected to a resistor 47 at the same common point. The other end of the resistor 47 is connected to the anode of the diode 48. Between the anode 43, of the switch 41 and point B is connected a resistor 45 and a variable tuning resistor 46. The anode of the diode 49 is connected to ground or a reference potential. An A.C. voltage divider is employed and includes a capacitor 52 and a resistor 51 which act to apply a predetermined portion of the trigger signal across capacitor 52. Capacitor 52 also acts to add the trigger signal from network 20 and a voltage feedback through resistors 45 and 46. A capacitor 53 is connected across resistor 51 to provide an additional phase shift to the trigger signal to prevent improper firing of switch 41. Capacitor 52 is connected between point B and reference point C. Capacitor 53 and resistor 51 is connected between point B and the phase shifting network 20.

A clamp 60 is employed across the controlled rectifier 41 to prevent excess voltage across switch 41 in the reverse direction, and includes a diode 61 and a current limiter resistor 62. This prevents the controlled rectifier from having too large a reverse voltage applied thereacross.

General Description of Operation

FIG. 2 illustrates broadly the operation of the inverter during four periods occurring during a full cycle of operation of the inverter. These periods are defined as A, B, C and D in FIG. 2 and in FIG. 3.

The schematic diagrams of FIG. 2 illustrate the load inductor 21 as being connected between the point of constant current source A and the capacitor 22. In the embodiment of the invention illustrated in FIG. 1, the load inductor 21 is connected between the point of constant current A and the L-C network 30. This connection in FIG. 1 provides a D.C. bias current for the load inductor without requiring an external bias source. Such a bias increases the efficiency of some inductive transducers, such as a magnetostrictive transducer. Operation of both circuits is substantially the same.

When the constant current is initially applied, the capacitor 31 will charge during period A with the controlled rectifier 41 being in a non-conductive state. In the first or initial cycle of operation, the rectifier 41 will be rendered conductive since the voltage from the network 20 and the voltage from resistors 45 and 46 are both positive to provide a current sufficiently large through gate 44 to render rectifier 41 conductive. The voltage $e_t$, shown in FIG. 2, is symbolic of the trigger voltage which is a function of the voltage across the condenser 22 or inductor 22' shown in FIG. 1A, to render the rectifier 41 conductive. When the voltage $e_t$ exceeds a predetermined level while capacitor 31 is being charged, the rectifier 41 will conduct due to the gate current caused by $e_t$, to thereby define the end of period A as shown in FIG. 2A.

Figure 2B:
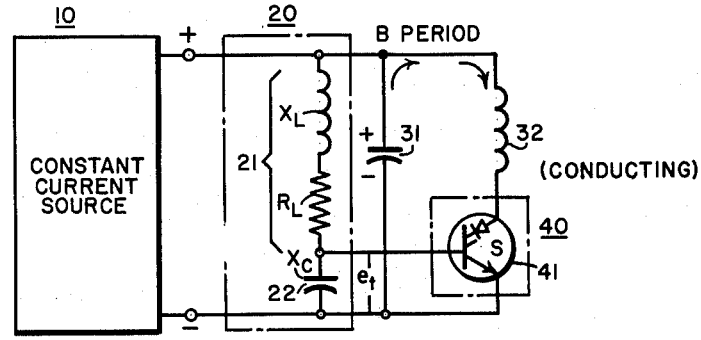
Figure 2C:
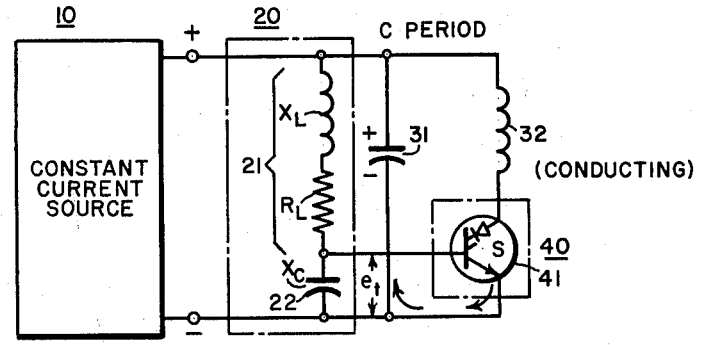
Figure 2D:
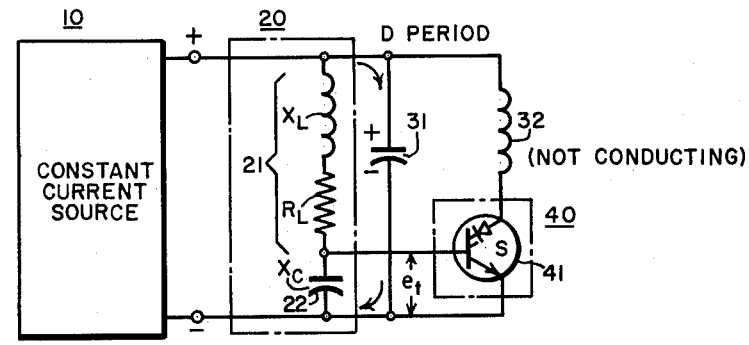

When the rectifier 41 is thus rendered conductive, the charging capacitor 31 will discharge through the inductor 32 and the controlled rectifier 41 during period B, as shown in FIG. 2B. When the charging capacitor 31 has completely discharged through the discharge circuit, effected by the rectifier 41, period B will end. Period C then begins with the capacitor 31 having no charge or energy stored therein but with the inductor 32 then having stored energy to thereby act as a current generator to maintain current in the same direction as in period B. Due to the values of the inductor 32 and the capacitor 31, the current effected by the inductor 32 during period C will far exceed the constant current of the constant current source so that the capacitor 31 will be charged, during period C, to the polarity indicated in FIG. 2C. When the field of the inductor 32 has completely collapsed, the reverse charge on the capacitor 31 will be applied across controlled rectifier 41 to render it non-conductive and period D will commence. During period D the capacitor 31 will then be recharged from the polarity shown in FIG. 2C to the polarity shown in FIG. 2A, by the constant current source.

Detailed Description of Operation

The trigger voltage $e_t$ is illustrated in FIG. 2 as constituting only the voltage across the capacitor 22. In the embodiment of the invention illustrated in FIG. 1, however, the signal actually applied to gate 44 is the sum or integration of two A.C. voltages, a portion of the output of the phase shifting network 20 having a relatively low natural frequency of its own and a feedback voltage effected by resistors 45 and 46 which circuit has a relatively high natural frequency of its own. These A.C. signals are added across capacitor 52, and when the resultant signal appearing at point B becomes sufficiently positive resulting in a sufficient amount of gate current in the rectifier 41 to thereby render it conductive. By using these two signals, the firing of the rectifier 41 is done substantially independent of the cathode to anode voltage across rectifier 41.

The resistor 51 and the capacitor 52 act as an A.C. voltage divider for the A.C. voltage appearing across capacitor 22 so that a predetermined portion of the A.C. signal appearing across capacitor 22 is applied across adding capacitor 52. The capacitor 52 also acts to delay slightly the resultant trigger voltage so that the device may operate at a lower frequency.

As stated above, the signal applied to capacitor 52 from network 20 is added to an A.C. signal applied to capacitor 52 through resistors 45 and 46 to produce the actual firing signal voltage. Resistor 46 is variable so as to change the amount of this feedback to vary the firing point of rectifier 41 and thereby vary the frequency of the output of the power supply. The resistor 47 supplies current to the gate 44 when either of the above feedback signals are negative. This keeps the gate from firing the rectifier 41 when either of the feedbacks is negative. This bias is kept constant by the forward drop across diode 49, as illustrated in curve $e$ of FIG. 3. This bias on the gate 44 decreases the recovery time of rectifier 41 required to recover its forward blocking characteristics. The bias additionally increases the peak inverse voltage allowable across rectifier 41. Diode 49 clips off or prevents large negative transients across gate 44 when the control rectifier 41 is switched from the conducting to the non-conducting mode. When the constant current source is first applied, a direct current path is provided through resistors 45, 46 and 47, gate 44 and cathode 42. This D.C. current path provides current from the constant current source so as to render the rectifier 41 conductive at a predetermined current level. In subsequent cycles of oscillation however, the point B is driven negative. Consequently, when point B is negative going, the diode 49 will be conducting in the forward direction to provide a circuit path through resistor 47.

The alternating current voltages appearing across charging capacitor 31 will be in phase with the voltage impressed across the phase shifting network 20 including the power factor correction condenser 22 and the load inductor 21. Hence, the voltage across the capacitor 22 will have a relatively large phase difference relative to the voltage across the charging capacitor 31 and therefore relative to the voltage across the controlled rectifier 41.

Curve $a$, FIG. 3, illustrates the voltage appearing across the controlled rectifier 41 by the charging of capacitor 31 during period A. When the trigger voltage $e_t$ effects sufficient forward gate current through the rectifier 41, while capacitor 31 is being charged, the rectifier 41 will be rendered conductive to provide a discharge path for condenser 31 and the voltage across rectifier 41 will drop to nearly zero to define the end of period A. As shown in curve $b$, FIG. 3, at the beginning of period B, when capacitor 31 commences to discharge, the voltage across the inductor 32 will be at a maximum, and during period B, the capacitor 31 will completely discharge through this inductor 32. During period C, as shown in curve *b* of FIG. 3, the inductor 32 will act as a current generator to maintain current through the rectifier 41 in the same direction as in period B so as to charge the capacitor 31 to an opposite polarity as its polarity during period B.

As shown in curve *f* of FIG. 3, during period D, there is substantially no forward current but rather a rearward voltage across the gate 44 and cathode 42 during periods D and A as shown in curve *e* of FIG. 2. However, during periods B and C, the trigger $e_t$ is sufficiently positive so as to provide a gate current during periods B and C. The current through the controlled rectifier 41 during periods B and C is illustrated in curve *f* of FIG. 3 and is effected by the collapse of the inductor 32. When the field of the inductor 32 is fully collapsed, the capacitor 31 will commence to discharge in the opposite direction and momentarily pass current through the controlled rectifier 41 in the rearward direction as shown in the FIG. 3 (*f*) curve. When this rearward current has cleared the junction of stored majority carriers, the rectifier 41 is suddenly rendered non-conductive. This current is illustrated by the shore negative going current shown in curve *f* of FIG. 3. This rearward current through the rectifier 41 by the capacitor 31 will quickly cut off the gate current of rectifier 41. The current through the inductor 21 of the vibrating transducer resulting from the oscillations in periods A, B, C and D is shown in curve *d* of FIG. 3. As stated above if the transducer is capacitive the capacitor 22 would be replaced by an inductor of a proper value, i.e. a reactance member of opposite kind as shown in FIG. 1A, to produce similar results. Whether the transducer is inductive as shown in FIG. 1 or capacitive as shown in FIG. 1A, the signal across integrating capacitor 52 will be of the proper phase to fire the switch 41. Also in either case the firing of switch 41 is effected primarily by the trigger signal $e_t$ due to the feedback through resistors 45 and 46. The switch 41 will, however, be turned off by the anode to cathode voltage and current applied to switch 41 by the capacitor 31.

Figure 4:
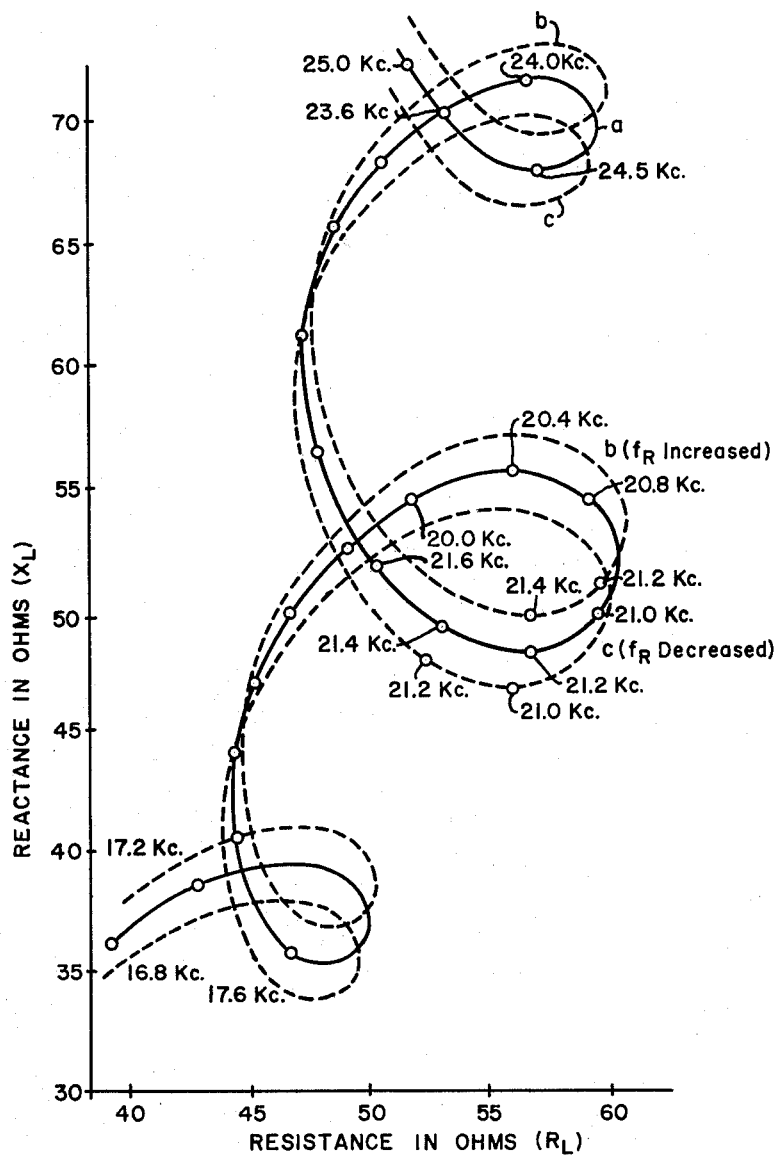
FIGURE 4 illustrates charts which are useful in explaining the embodiment of the invention illustrated in FIG. 1.

FIG. 4 illustrates characteristic curves of a magnetostrictive transducer. For various frequencies of the input to the load coil of the transducer (21), the reactance of the load coil is platted in ohms against the effective equivalent resistance reflected back to the coil by the transducer. Curve *a* illustrates such a curve for a given magnetostrictive transducer which is driving a tank of water for ultrasonic vibration of the water in the tank. The various frequencies on this curve are listed in kilocycles. If the resonant frequency $f_r$ of this tank or system is increased, the resulting characteristic curve is as shown in dotted lines as curve *b*. If the resonant frequency of this system is decreased, its characteristic curve will be as shown in curve *c* in dotted lines.

Assuming curve *a* to be the initial operating state of the system, if the natural resonant frequency of the system (21.2 kc.) is increased such as by losing water or by other means, from 21.2 kc. to 21.4 kc., the resultant chracteristic curve will be similar to that shown in curve *b*. If the device illustrated in FIG. 1 was initially tuned, by variable resistor 46, to the resonant frequency 21.2 kilocycles of the system, the initial resonant frequency, 21.2 kilocycles will be moved towards the right as shown in curve *b*, when the system resonance increases to 21.4 kc. Since 21.2 kilocycles is moved to the right on this graph, the equivalent resistance of the system reflected back through the load coil to the phase shifting network, will be increased from about 55 to about 59 ohms. If $\phi$ is the current lag of $e_t$ relative to the voltage across the charging capacitor 31, the tangent of $\phi$ is equal to $$\frac{x_L - x_C}{R_L}$$

where; $x_L$ is the inductive reactance in ohms of coil 21 (shown in FIG. 4), $R_L$ is the resistance coil 21 (shown in FIG. 4) and $x_C$ is the reactance of capacitor 22. FIG. 2 illustrates schematically these reactances. Hence, an increase of the resistance reflected through the coil by the equivalent circuit of the magnetostrictive transducer, will tend to decrease the lag of the alternating current through the load inductor 21 and the capacitor 22. Although $x_L$ also increases this increase is relatively small compared to the increase $R_L$ and $\phi$ will decrease despite this small increase of $x_L$. A decrease in this current lag results in the actuating or trigger signal $e_t$ having a phase relationship with the voltage across the controlled rectifier, so as to fire the controlled rectifier sooner and decrease the time period A. This of course increases the frequency of the generator so that it will tend to approach the resonant frequency of the transducer system, which has increased to provide a tracking action when the resonant frequency of the system increases.

If the resonant frequency of the transducer is changed from 21.2 kilocycles to approximately 21 kilocycles so as to decrease the resonant frequency of the system, the resulting characteristic curve will be similar to that shown in curve *c* of FIG. 4. As can be seen from this figure, the initial resonant frequency of the system, namely 21.2 kilocycles is then moved to the left of the original position on the graph so as to result in a decrease of equivalent resistance $R_L$ and an increase of $x_L$ being reflected back through to the transducer inductor 21. By decreasing the effective resistance, the phase angle $\phi$ between the currents through the inductor 21 and the capacitor 22, increases.

Hence it is seen that the power supply shown in FIG. 1 will respond to changes of the resonant frequency of the load to change its frequency toward the natural frequency of the load. By so doing a maximum transfer of power is obtained, providing a highly efficient device. This feature is particularly important in ultrasonic cleaning where a change of water level and other factors almost continuously change the natural frequency of the load. This is done in the ultrasonic power supply of FIG. 1 without the use of external feedback transformers or circuits. Further this circuit requires no transformer to apply the power to the transducer. As will be understood this tracking action can also be obtained with a capacitive transducer as shown in FIG. 1A since the characteristic curve of Reactance vs. Resistance (similar to FIG. 4) for a capacitive transducer is the same as FIG. 4 but inverted. In such instance a reactance member of opposite kind, i.e. an inductance is combined with the capacitive transducer as explained previously.

A power supply as shown in FIG. 1 was built and tested with an output of 500 watts being applied to the transducer coil 21. A spaced lamination magnetostrictive transducer was employed similar to the transducer disclosed in abandoned U.S. patent application Serial No. 722,817, entitled "Electrical Transducer Apparatus" by Edwin B. Wright, filed March 20, 1958, now continuation U.S. patent application Serial No. 223,305, filed September 11, 1962. The following component values wer employed to produce an output, the frequency of which was adjustable from 16 kilocycles to 23 kilocycles.

| | |
|---|---|
| 14 | 15 millihenries. |
| 21 | Magnetostrictive transducer—.64 millihenry. |
| 22 | .1 mf. |
| 31 | .5 mf. |
| 32 | 80 microhenries. |
| 45 | 5,000 ohms. |
| 46 | 20,000 ohms variable. |
| 47 | 20,000 ohms. |
| 51 | 7,500 ohms. |
| 52 | .01 mfd. |
| 53 | 820 mmfd. |
| 41 | Transitron STCR–240. |

This unit produced an output of over 400 watts with a frequency of 19.6 kilocycles. Other units were tested with frequencies of 16 kc. to 24 kc. with over 400 watts output.

It is to be understood that the reciprocal relation of the impedance elements 31 and 32 and the reactive and reactance members 21 and 22 of opposite kind refer to capacitors and inductors as may be selected in accordance with the type of transducer to be driven by the power supply described.

Although the invention has been described in connection with a specific embodiment, it will be apparent to those skilled in the art that various changes and form arrangement in parts can be made to suit requirements without departing from the spirit and scope of the invention.

I claim as my invention:

1. In combination, a vibrating transducer, an L-C network, a source of direct current for charging said network, a phase shifting network including the reactance of said transducer operatively connected to said L-C network for producing a trigger signal having a frequency dependent on the equivalent electrical characteristics of said transducer, and switch means responsive to said trigger signal to periodically provide a discharge path for said L-C network.

2. A power supply for a vibrating transducer including a reactive member having electrical characteristics functionally related to the load to be driven, said power supply comprising an L-C network, a source of direct current for charging said network, switch means for periodically discharging said network to initiate oscillations therein, a phase shifting network connected to said L-C network including a reactance member and means for connecting said reactance member to said transducer reactive member for periodically applying trigger signals to said switch means the time spacing therebetween being dependent upon the electrical characteristics of said transducer.

3. In combination, a vibrating transducer including a reactive member, an impedance branch for storing electrical energy, a source of direct current for applying electrical energy to said impedance branch, switch means for periodically discharging said impedance branch to initiate oscillations therein, a phase shifting network for producing trigger signals to actuate said switch means including an impedance member and said transducer reactive member, and means for applying a signal from said impedance branch to said impedance member and said transducer reactive member for producing trigger signals the frequency of which is a function of the electrical characteristics of said transducer.

4. A power supply for a vibrating transducer including a reactive member having electrical characteristics functionally related to the load to be driven, said power supply comprising an L-C network including a capacitor member and an inductor member, a constant current source for charging said capacitor, a phase shifting network including a reactance member and means for connecting said reactance member to said transducer serially connected across said capacitor member for producing a trigger signal variable in phase with the signal on said capacitor member in response to electrical variations of said reactive member, and switch means responsive to said trigger signal to periodically discharge said capacitor through said inductor member to effect oscillations therein.

5. In combination, a vibrating transducer including a reactive member, an L-C network including a capacitor and an inductor, a constant current source for continuously applying energy to said capacitor, a phase shifting network including said reactive member and a reactance member of opposite kind to said reactive member connected across said capacitor for producing a trigger signal across said reactance member the phase of which varies in response to variations of said transducer reactive member, and switch means responsive to said trigger signal to periodically provide a discharge path for said capacitor through said inductor to effect oscillations in said L-C network.

6. In combination, a vibrating transducer reactive member, an L-C network including a capacitor and an inductor, a source of direct current connected to said capacitor for applying energy thereto, a phase shifting network including said reactive member and a reactance member of opposite kind to said reactive member connected across said capacitor for producing a trigger signal across said reactance member having a phase dependent upon the variations of the equivalent electrical characteristics of said reactive member, a switch means connected between said capacitor and said inductor for periodically providing a discharge path for said capacitor through said inductor in response to said trigger signal and responsive to oscillations in said L-C network to open said discharge path to effect recharging of said capacitor.

7. In combination, a vibrating transducer reactive member; an L-C network; means for connecting said network and said transducer reactive member to a source of direct current to respectively charge said network and bias the transducer reactive member to a suitable flux density with the same current; a phase shifting network including said transducer reactive member operatively connected to said L-C network for providing a trigger signal having a frequency dependent on the equivalent electrical characteristics of said transducer reactive member; and switch means responsive to said trigger signal to periodically provide a discharge path for said L-C network.

8. A power supply for a vibrating transducer including a reactive member having electrical characteristics functionally related to the load to be driven; said power supply comprising, a first impedance element and a second impedance element reciprocally related to said first impedance element and connected in circuit combination therewith; means for charging said first impedance element; switching means responsive to a trigger signal for controlling the flow of energy between said first impedance element and said second impedance element; and means for providing a trigger signal to said switching means; said last-mentioned means including means for connection to said transducer reactive member and a reactance member of opposite kind to said reactive member operably connected to said first impedance element for providing a trigger signal lagging the voltage across said first impedance element as a function of the electrical characteristics of said transducer reactive member.

9. In combination, a first impedance element and a second impedance element reciprocally related to said first impedance element and connected in circuit combination therewith; means for charging said first impedance element; switching means responsive to a trigger signal for controlling the flow of energy between said first impedance element and said second impedance element; a vibrating transducer including a reactive member having an impedance functionally related to the load to be driven by said transducer and a reactance member of opposite kind to said reactive member operably connected across said first impedance element; and means for summing the voltage across said switching means and the voltage across said reactance member to provide a trigger signal to said switching means when the sum exceeds a predetermined magnitude.

10. A power supply for a vibrating transducer including a reactive member having an impedance functionally related to the load to be driven by said transducer comprising, in combination; a first impedance element and a second impedance element reciprocally related to said first impedance element and connected in circuit combination therewith; means for charging said first impedance element; switching means responsive to a trigger signal for controlling the flow of energy between said first impedance element and said second impedance element; a phase shifting network connected across said first impedance element including a reactance member having an impedance of opposite kind to that of said transducer reactive member and means for connecting said reactance member to said reactive member; and means for summing the voltage across said reactance member and the voltage across said switching means to provide a trigger signal to said switching means when the sum exceeds a predetermined magnitude.

11. In combination, a first impedance element and a second impedance element reciprocally related to said first impedance element and connected in circuit combination therewith; switching means responsive to a trigger signal for controlling the flow of energy between said first impedance element and said second impedance element; a vibrating transducer including a reactive member having electrical characteristics functionally related to the load to be driven; an impedance of opposite kind to that of the transducer reactive member connected in series circuit combination with said transducer reactive member across said first impedance element; means responsive to the voltage across said opposite kind impedance for providing a trigger signal to said switching means; and means for connecting a source of direct current to the junction of said transducer reactive member and said opposite kind impedance.

12. A power supply for a vibrating transducer including a reactive member having an impedance functionally related to the load to be driven thereby, said power supply comprising; semiconductor switching means having an anode electrode, a cathode electrode and a gate electrode; a first impedance element and a second impedance element connected in series loop combination with the anode electrode-cathode electrode circuit of said semiconductor switching means; said second impedance element reciprocally related to said first impedance element; voltage summing means for firing said semiconductor switching means; said semiconductor switching means having a conductive state responsive to being fired by said summing means; a series circuit combination connected across said first impedance element comprising means for connection to said reactive member, and a reactance member of opposite kind to that of said reactive member; means for connecting a source of direct current to the junction of said means for connection to said reactive member and said reactance member; means for connecting the voltage across said reactance member to said summing means; said summing means operably connected to said gate electrode; and variable impedance means connecting the anode electrode to the gate electrode, whereby the voltage across said semiconductor switching means is selectively added to the voltage across the reactance member to vary the frequency of firing of said semiconductor switching means.

13. In combination, a switching device having an anode electrode, a cathode electrode and a gate electrode and having a conductive state responsive to a trigger signal to said gate electrode; a series resonant circuit combination including a first impedance element, a second impedance element and the anode electrode-cathode electrode circuit of said switching device connected to interchange energy from said first impedance element to said second impedance element when said device is in its conductive state; summing means for providing a trigger signal to said gate electrode in response to the voltage across said summing means exceeding a predetermined level; a transducer including a reactive member having an impedance functionally related to the load to be driven by said transducer and a reactance member of opposite kind to that of said reactive member connected in series circuit combination across said first impedance element; means for connecting a source of direct current to the junction of said reactive member and said reactance member; circuit means for connecting across said summing means the voltage across said reactance member; and variable means for providing across said summing means a portion of the voltage across the anode electrode-cathode electrode circuit of said switching device, whereby the resulting trigger signal from said summing means will fire said switching device with a frequency substantially equal to that of the resonant frequency of said transducer.

14. The power supply of claim 13 wherein said circuit means includes means for dividing the voltage across said reactance member; said means for dividing including a resistance element and a capacitance element providing a constant phase relationship with the voltage across said reactance member; and means connected across said resistance element for slightly advancing said phase relationship.

15. A power supply for a vibrating transducer including a reactive member having a resonant frequency functionally related to the load to be driven thereby comprising, in combination; a source of direct current; a series resonant circuit having a Q sufficiently large for the circulating current, if allowed to flow therein, to be greater than the magnitude of current from said source; a semiconductor switching device connected to control current through said series resonant circuit in response to a trigger signal; means for connecting the transducer reactive member to said series resonant circuit; means for connecting said source of constant current to said tranducer reactive member and said series resonant circuit; means for tracking the resonant frequency of said transducer reactive member for providing trigger signals of substantially the same frequency; and means operably connected to said switching device for fine tuning of the frequency of said trigger signals to a frequency equal to said resonant frequency.

16. The apparatus of claim 15 wherein said semiconductor switching device has a conducting state responsive to said trigger signal for allowing passage of said circulating current and said constant current and a non-conducting state responsive to the change in direction of said circulating current for blocking current in either direction.

References Cited in the file of this patent
UNITED STATES PATENTS

| 2,301,928 | Brown | Nov. 17, 1943 |
| 2,769,906 | Kidd | Nov. 6, 1956 |
| 2,889,460 | Ehret | June 2, 1959 |
| 2,895,095 | Guyton | July 14, 1959 |
| 2,931,898 | Endres | Apr. 5, 1960 |
| 2,939,064 | Momberg | May 31, 1960 |
| 2,985,847 | Chauvin | May 23, 1961 |
| 3,040,224 | Piltz | June 19, 1962 |

OTHER REFERENCES

Publication: Solid State Products, Inc., 1 Pingree St., Salem, Mass., Bulletin D420–02 e.g. pages 12 and 13.